United States Patent
Gunter (10) Patent No.: US 9,062,747 B2
(45) Date of Patent: Jun. 23, 2015

(54) LEAD SCREW LOCKING MECHANISM

(71) Applicant: The Boeing Company, Chicago, IL (US)

(72) Inventor: Ian Miles Gunter, Burien, WA (US)

(73) Assignee: THE BOEING COMPANY, Chicago, IL (US)

(*) Notice: Subject to any disclaimer, the term of this patent is extended or adjusted under 35 U.S.C. 154(b) by 94 days.

(21) Appl. No.: 13/893,627

(22) Filed: May 14, 2013

(65) Prior Publication Data

US 2014/0338481 A1    Nov. 20, 2014

(51) Int. Cl.
*F16H 25/12* (2006.01)
*F16B 39/00* (2006.01)
*F16H 25/20* (2006.01)

(52) U.S. Cl.
CPC ........... *F16H 25/12* (2013.01); *Y10T 74/18688* (2015.01); *F16B 39/00* (2013.01); *F16H 25/2015* (2013.01); *F16H 25/2025* (2013.01)

(58) Field of Classification Search
CPC .......................... F16H 25/2025; F05C 2251/08
USPC ............. 74/89.23, 89.37, 89.39; 70/229–232; 411/DIG. 2, 82.5, 277, 278; 148/402, 148/563
See application file for complete search history.

(56) References Cited

U.S. PATENT DOCUMENTS

| 4,619,568 | A | * | 10/1986 | Carstensen | 411/222 |
| 4,880,343 | A | * | 11/1989 | Matsumoto | 411/222 |
| 5,484,244 | A | * | 1/1996 | Glovan et al. | 411/424 |
| 2002/0062547 | A1 | * | 5/2002 | Chiodo et al. | 29/426.5 |
| 2003/0101834 | A1 | * | 6/2003 | Huang | 74/89.42 |
| 2006/0246258 | A1 | * | 11/2006 | Ikeda et al. | 428/138 |

FOREIGN PATENT DOCUMENTS

| FR | 2961876 A1 | 12/2011 |
| GB | 1569915 A | 6/1980 |
| JP | 2009133334 A | 6/2009 |

OTHER PUBLICATIONS

"Acme Lead Screws & Nuts," Roton Products, Inc., copyright 1997-2009, 3 pages, accessed May 14, 2013. www.roton.com/page.aspx?id=1.
"Constant Force Technology: Lead Screws, Nuts, & Hybrid Linear Actuators," PBC Linear, a Pacific Bearing Company, copyright 2012, 4 pages.
"Shape-memory alloy," Wikipedia Foundation, Inc., revised May 2013, 6 pages, accessed May 14, 2013. en.wikipedia.org/wiki/Shape-memory_alloy.
International Search Report and Written Opinion, dated Aug. 26, 2014, regarding Application No. PCT/US2014/031619, 10 pages.

* cited by examiner

*Primary Examiner* — William Kelleher
*Assistant Examiner* — Thomas Magnuson
(74) *Attorney, Agent, or Firm* — Yee & Associates, P.C.

(57) ABSTRACT

A method and apparatus for locking an externally threaded member in place. An apparatus comprises a number of internally threaded members and a shape memory element associated with the number of internally threaded members. The number of internally threaded members is configured to engage the externally threaded member. Changing a baseline shape of the shape memory element to a modified shape either prevents or allows movement of the number of internally threaded members relative to the externally threaded member.

20 Claims, 7 Drawing Sheets

LEAD SCREW LOCKING MECHANISM

BACKGROUND INFORMATION

1. Field

The present disclosure relates generally to threaded members and, in particular, to locking mechanisms for threaded members. Still more particularly, the present disclosure relates to an apparatus and method for preventing rotational motion of an externally threaded member relative to one or more internally threaded members using a shape memory element.

2. Background

In certain systems and assemblies, threaded shafts, such as, for example, lead screws, are used to convert rotational motion into linear motion. For example, rotating a lead screw about a longitudinal axis through the lead screw relative to a nut engaged with the lead screw may cause translation of the nut in a direction along the axis relative to the lead screw. As one specific example, a lead screw in a milling machine may be rotated by a motor, which may drive a nut engaged with the lead screw in a direction along a longitudinal axis through the lead screw.

This type of movement mechanism may allow for precise control of the position of the nut. Further, with this type of movement mechanism, the thread pitch of the external thread of the lead screw and the thread pitch of the internal thread of the nut may be designed such that the nut moves relative to the lead screw according to selected mechanical requirements.

Depending on the implementation, rotation of the lead screw may result in translation of the nut or the lead screw relative to the other. In other examples, rotation of the nut around the lead screw may result in translation of the lead screw or the nut relative to the other.

In some cases, a mechanism that prevents the nut engaged with the lead screw from moving relative to the lead screw in response to vibration, movement of the assembly, and/or other factors may be desirable. For example, when a lead screw is used in a braking system, a mechanism for preventing the nut engaged with the lead screw from back driving may be required. However, a locking mechanism capable of preventing the relative rotation between a lead screw and a nut within selected tolerances may not be available. Therefore, it would be desirable to have a method and apparatus that take into account at least some of the issues discussed above, as well as other possible issues.

SUMMARY

In one illustrative embodiment, an apparatus comprises a number of internally threaded members and a shape memory element associated with the number of internally threaded members. The number of internally threaded members is configured to engage an externally threaded member. Changing a baseline shape of the shape memory element to a modified shape either prevents or allows movement of the number of internally threaded members relative to the externally threaded member.

In another illustrative embodiment, a locking mechanism comprises a shape memory element associated with a number of internally threaded members engaged with an externally threaded. Changing a baseline shape of the shape memory element to a modified shape either prevents or allows movement of the number of internally threaded members relative to the externally threaded member.

In yet another illustrative embodiment, a method for operating an externally threaded member with a number of internally threaded members is provided. The externally threaded member is received within the number of internally threaded members. A baseline shape of a shape memory element associated with the number of internally threaded members is changed to a modified shape to either prevent or allow movement of the number of internally threaded members relative to the externally threaded member.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a locking mechanism that can easily and quickly prevent the relative rotation between a lead screw and one or more nuts engaged with the lead screw in an assembly within selected tolerances. Further, the illustrative embodiments recognize and take into account that it may be desirable to have a locking mechanism that does not increase the weight and/or size of this assembly more than desired.

Thus, the illustrative embodiments provide a locking mechanism for use with an externally threaded member and a number of internally threaded members configured to engage the externally threaded member. In one illustrative embodiment, a locking mechanism comprises a number of internally threaded members, a shape memory element associated with the number of internally threaded members, and a shape control device. The number of internally threaded members is configured to engage an externally threaded member such that rotational motion of the externally threaded member relative to the number of internally threaded members is translated into linear motion of the externally threaded member relative to the number of internally threaded members. The shape memory element has a shape that changes in response to a change in temperature of the shape memory element. Changing the shape of the shape memory element prevents the rotational motion of the externally threaded member relative to the number of internally threaded members. The shape control device is configured to change the temperature of the shape memory element.

Figure 1:
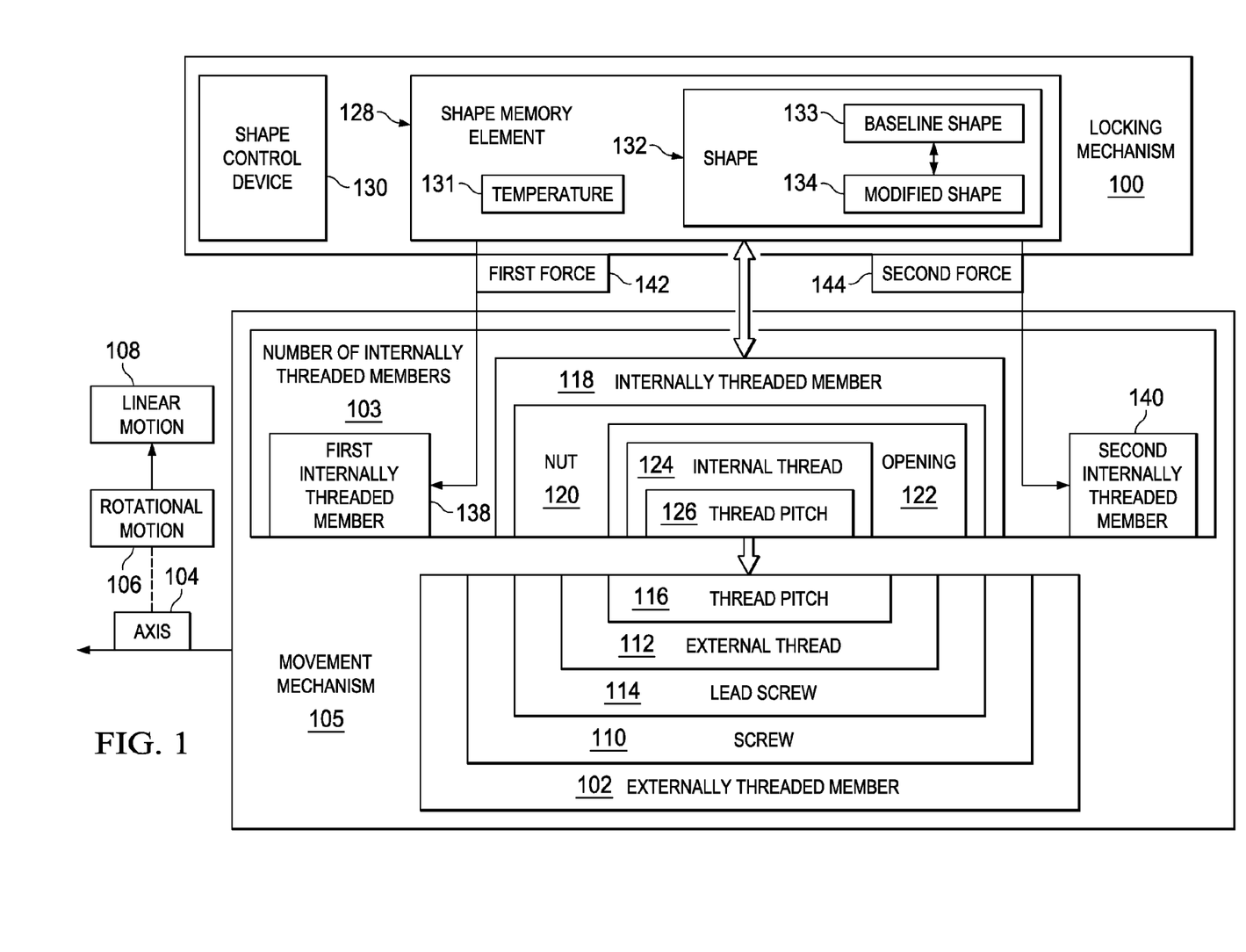
FIG. 1 is an illustration of a locking mechanism in the form of a block diagram in accordance with an illustrative embodiment.

Referring now to the figures and, in particular, with reference to FIG. 1, an illustration of a locking mechanism is depicted in the form of a block diagram in accordance with an illustrative embodiment. In this illustrative example, locking mechanism 100 may be configured to prevent relative rotation between externally threaded member 102 and number of internally threaded members 103.

As used herein, a "number of" items may be one or more items. In this manner, number of internally threaded members 103 may include one or more internally threaded members.

Externally threaded member 102 and number of internally threaded members 103 may form movement mechanism 105. As used herein, an externally threaded member, such as externally threaded member 102, may be implemented in the form of any elongate member having an external thread along at least a portion of the outer surface of the externally threaded member. In this illustrative example, externally threaded member 102 may be rotatable about axis 104 through externally threaded member 102. Axis 104 may be, for example, a center longitudinal axis through externally threaded member 102.

Externally threaded member 102 may be configured to convert rotational motion 106 into linear motion 108. In particular, externally threaded member 102 may convert the rotational motion 106 of one of externally threaded member 102 and number of internally threaded members 103 about axis 104 relative to the other into linear motion 108 of one of externally threaded member 102 and number of internally threaded members 103 relative to the other.

As used herein, an internally threaded member, such as one of number of internally threaded members 103, may be implemented in the form of any structure having an opening configured to receive externally threaded member 102. Further, the opening may have an internal thread configured to engage the external thread on externally threaded member 102.

In one illustrative example, externally threaded member 102 may take the form of screw 110 having external thread 112. Screw 110 may be referred to as lead screw 114 in some cases. External thread 112 may have thread pitch 116. As used herein, the thread pitch of a threaded member, such as thread pitch 116 of screw 110, may be the distance from one thread groove to the next adjacent groove.

In this illustrative example, internally threaded member 118 may be an example of one of number of internally threaded members 103. Internally threaded member 118 may take the form of, for example, without limitation, nut 120 having opening 122 lined by internal thread 124. Internal thread 124 may have thread pitch 126. Thread pitch 126 of nut 120 may be designed to engage thread pitch 116 of screw 110. Of course, depending on the implementation, internally threaded member 118 may take the form of any structure or object having opening 122 with internal thread 124.

Locking mechanism 100 may be used to prevent rotation of internally threaded member 118 relative to externally threaded member 102 about axis 104 to prevent the movement of internally threaded member 118 in a direction along axis 104 relative to externally threaded member 102. As depicted, locking mechanism 100 may include shape memory element 128 and shape control device 130.

Shape control device 130 may be used to control temperature 131 of shape memory element 128 to control shape 132 of shape memory element 128. For example, shape memory element 128 may be comprised of a shape memory material, such as a shape memory alloy. A shape memory material, as used herein, is a material configured to deform when heated or cooled but remember its original shape. The shape memory material may take the form of, for example, without limitation, a nickel titanium alloy.

In one illustrative example, shape control device 130 may heat shape memory element 128 to change shape 132 of shape memory element 128 from baseline shape 133 to modified shape 134. Baseline shape 133 may be shape 132 of shape memory element 128 when temperature 131 of shape memory element 128 is at a baseline temperature or within a selected range of the baseline temperature. The baseline temperature may be, for example, without limitation, room temperature, ambient temperature, or some reference temperature.

Modified shape 134 may be, for example, any shape that is different from baseline shape 133 beyond selected tolerances. As one illustrative example, modified shape 134 may be a shape that is larger than baseline shape 133 by some selected percentage.

Shape control device 130 may comprise a heating device configured to heat shape memory element 128. The heating device may be an active heating device or a passive heating device, depending on the implementation.

Shape memory element 128 may be implemented in a number of different ways. In one illustrative example, shape memory element 128 may take the form of at least a portion of internally threaded member 118. In this manner, all of internally threaded member 118 may form shape memory element 128 in one example. For example, nut 120 may be a shape memory nut.

In another example, the portion of internally threaded member 118 comprising internal thread 124 may be shape memory element 128. In some cases, internal thread 124 may be considered shape memory element 128. For example, internal thread 124 may be comprised of a shape memory material such that internal thread 124 forms shape memory element 128.

When shape memory element 128 takes the form of at least a portion of internally threaded member 118, shape control device 130 may change temperature 131 of shape memory element 128 to change thread pitch 126 of internally threaded member 118. In particular, changing temperature 131 changes shape 132 of shape memory element 128, which may, in turn, change thread pitch 126. Shape 132 of shape memory element 128 may be, for example, without limitation, contracted, expanded, twisted, and/or changed in some other manner.

Changing thread pitch 126 of internally threaded member 118 prevents internally threaded member 118 from rotating about axis 104 relative to externally threaded member 102. In this manner, internally threaded member 118 may be locked in place relative to externally threaded member 102.

In another illustrative example, number of internally threaded members 103 may include first internally threaded member 138 and second internally threaded member 140 configured to receive externally threaded member 102. In this example, shape memory element 128 may take the form of a separate component configured to be positioned between first internally threaded member 138 and second internally threaded member 140.

For example, shape memory element 128 may be associated with both first internally threaded member 138 and second internally threaded member 140. As used herein, when one component is "associated" with another component, the association is a physical association in the depicted examples. For example, a first component, such as shape memory element 128, may be considered to be associated with a second component, such as first internally threaded member 138, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Shape memory element 128 may have an opening configured to receive externally threaded member 102. The inner surface of the opening of shape memory element 128 may have improved wear performance than the bearing surfaces of first internally threaded member 138 and second internally threaded member 140. Shape memory element 128 may function as a shape memory actuator between first internally threaded member 138 and second internally threaded member 140.

Changing temperature 131 of shape memory element 128 may change shape 132. For example, temperature 131 of shape memory element 128 may be changed to change shape 132 of shape memory element 128 such that shape memory element 128 exerts first force 142 to first internally threaded member 138 and second force 144 to second internally threaded member 140. First force 142 and second force 144 may be pushing forces, pulling forces, and/or other types of forces, depending on the implementation.

In one illustrative example, shape memory element 128 may contract to pull first internally threaded member 138 and second internally threaded member 140 closer together. In another example, shape memory element 128 may expand to push first internally threaded member 138 and second internally threaded member 140 away from each other. In yet another illustrative example, shape memory element 128 may twist to push and/or pull on each of first internally threaded member 138 and second internally threaded member 140.

First force 142 and second force 144 may prevent first internally threaded member 138 and second internally threaded member 140, respectively, from rotating about axis 104 relative to externally threaded member 102. In this manner, first internally threaded member 138 and second internally threaded member 140 may be locked in place relative to externally threaded member 102.

When number of internally threaded members 103 no longer need to be locked in place relative to externally threaded member 102, shape control device 130 may change temperature 131 back to the baseline temperature such that modified shape 134 of shape memory element 128 may revert back to baseline shape 133. When shape memory element 128 has baseline shape 133, number of internally threaded members 103 may be configured to rotate about axis 104 relative to externally threaded member 102 and thus, move in a direction along axis 104 relative to externally threaded member 102.

Shape control device 130 is described as controlling temperature 131 of shape memory element 128 to control shape 132 of shape memory element 128. However, in other illustrative examples, shape control device 130 may use pressure, magnetic forces, and/or other types of forces to control shape 132 of shape memory element 128.

The illustration of locking mechanism 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Depending on the implementation, number of internally threaded members 103 may be considered part of locking mechanism 100. Further, in one illustrative example, shape control device 130 may be separate from shape memory element 128. However, in other illustrative examples, shape memory element 128 may be comprised of a material configured to function as a passive heating device. In this manner, shape control device 130 may be part of shape memory element 128.

Further, in other illustrative examples, baseline shape 133 of shape memory element 128 may be configured to prevent movement of number of internally threaded members 103 relative to externally threaded member 102. In these examples, changing baseline shape 133 to modified shape 134 may then be configured to allow movement of number of internally threaded members 103 relative to externally threaded member 102. In this manner, depending on the implementation, changing baseline shape 133 to modified shape 134 may either prevent or allow movement of number of internally threaded members 103 relative to externally threaded member 102.

Figure 2:
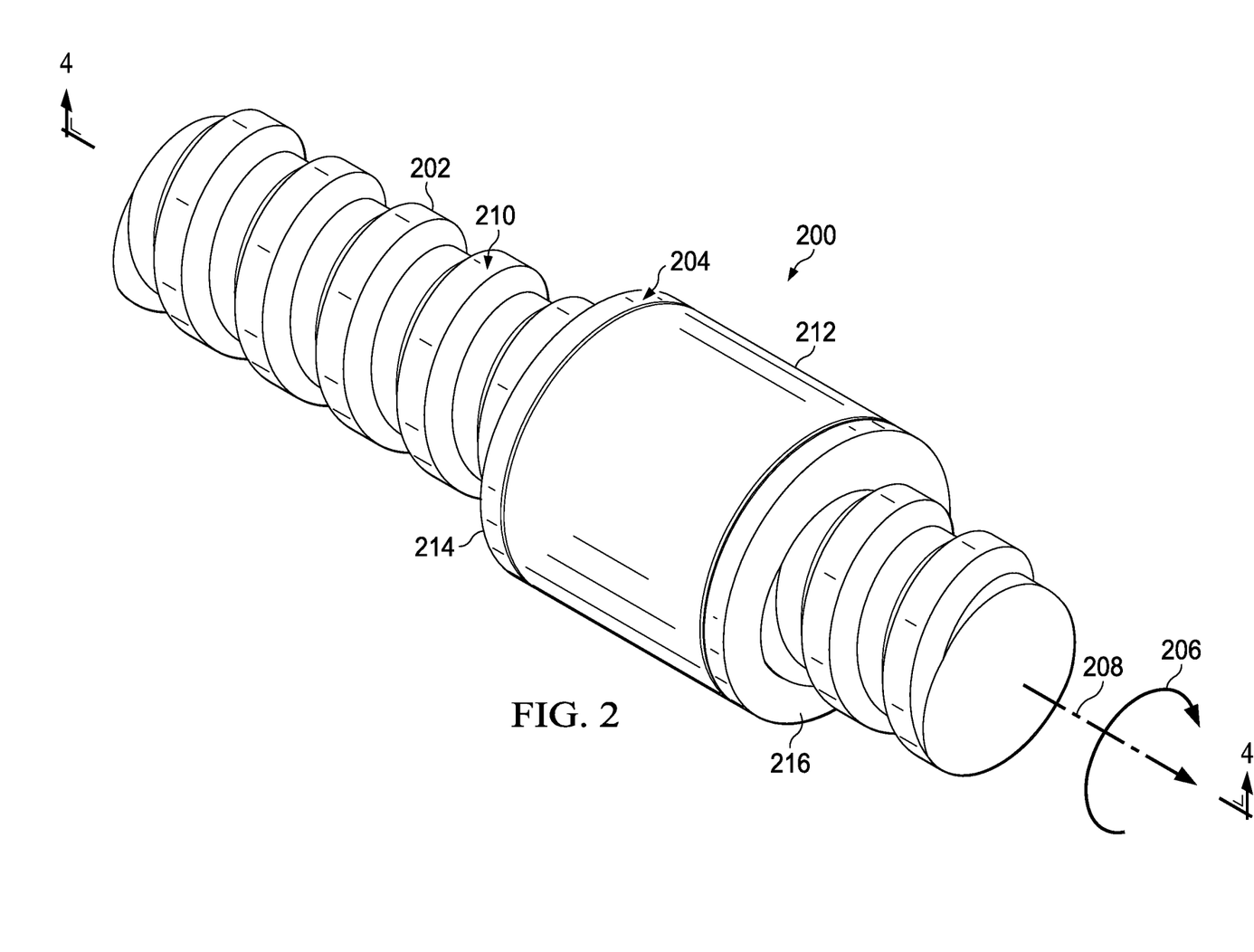
FIG. 2 is an illustration of an isometric view of a locking mechanism for use with an externally threaded member in accordance with an illustrative embodiment.

With reference now to FIG. 2, an illustration of an isometric view of a locking mechanism for use with an externally threaded member is depicted in accordance with an illustrative embodiment. In this illustrative example, locking mechanism 200 may be an example of one implementation for locking mechanism 100 in FIG. 1.

Locking mechanism 200 may be used with lead screw 202 to prevent relative rotation between shape memory nut 204 and lead screw 202. Lead screw 202 is an example of one implementation for lead screw 114 in FIG. 1. Shape memory nut 204 is an example of one implementation for shape memory element 128 in FIG. 1 in which shape memory element 128 is implemented as part of nut 120 in FIG. 1.

Lead screw 202 may be rotated in the direction of arrow 206 about axis 208 to cause shape memory nut 204 to move in a direction along axis 208. For example, lead screw 202 has external thread 210. Shape memory nut 204 has an internal thread (not shown) configured to engage external thread 210. Rotation of lead screw 202 about axis 208 relative to shape memory nut 204 may cause movement of shape memory nut 204 in a direction along axis 208 as guided by external thread 210 of lead screw 202 and the internal thread of shape memory nut 204.

In this illustrative example, locking mechanism 200 is formed by both shape memory nut 204 and heating device 212. Heating device 212 is an example of one implementation for shape control device 130 in FIG. 1. Heating device 212 is attached to shape memory nut 204 and positioned between flange 214 and flange 216 of shape memory nut 204. Heating device 212 may heat shape memory nut 204 to change a shape of shape memory nut 204 such that movement of shape memory nut 204 along axis 208 is prevented.

Figure 3:
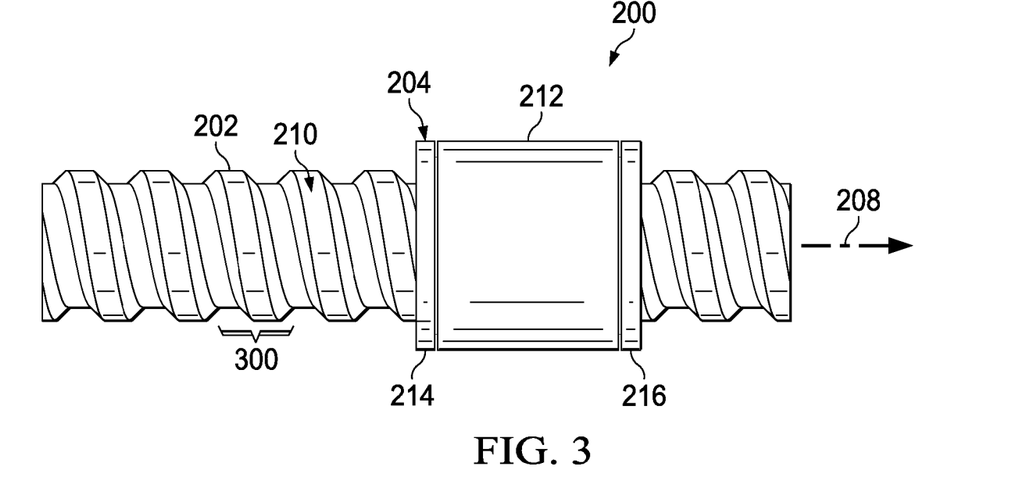
FIG. 3 is an illustration of a side view of a locking mechanism and a lead screw in accordance with an illustrative embodiment.

With reference now to FIG. 3, an illustration of a side view of locking mechanism 200 and lead screw 202 from FIG. 2 is depicted in accordance with an illustrative embodiment. As depicted, external thread 210 of lead screw 202 has thread pitch 300.

Figure 4:
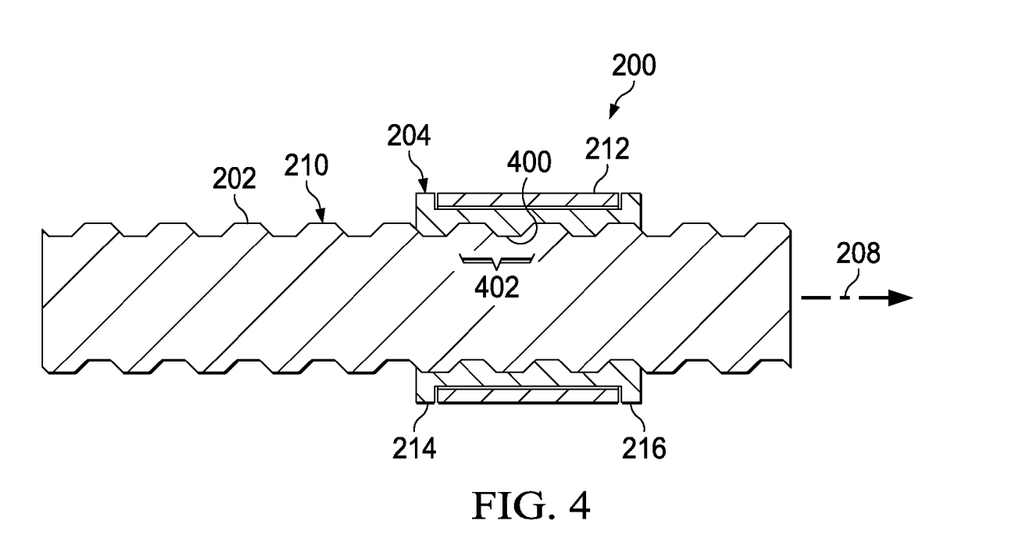
FIG. 4 is an illustration of a cross-sectional view of a locking mechanism and a lead screw in accordance with an illustrative embodiment.

Turning now to FIG. 4, an illustration of a cross-sectional view of locking mechanism 200 and lead screw 202 from FIGS. 2-3 is depicted in accordance with an illustrative embodiment. In particular, in FIG. 4, a cross-sectional view of locking mechanism 200 and lead screw 202 from FIGS. 2-3 is depicted taken with respect to lines 4-4 in FIG. 2.

In this illustrative example, internal thread 400 of shape memory nut 204 may be seen. Internal thread 400 has thread pitch 402. Thread pitch 402 is selected to engage thread pitch 300 such that shape memory nut 204 may be moved along axis 208 relative to lead screw 202 when shape memory nut 204 is at a baseline temperature within selected tolerances.

Heating device 212 may be configured to heat shape memory nut 204 such that thread pitch 402 changes. This change in thread pitch 402 may prevent shape memory nut 204 from being able to rotate relative to lead screw 202. In this manner, shape memory nut 204 may be prevented from moving linearly along axis 208 relative to lead screw 202.

When the temperature of shape memory nut 204 returns to a baseline temperature or within a selected range of the baseline temperature, the shape of shape memory nut 204 may return to its baseline shape and thread pitch 402 may return to its original size. In this manner, shape memory nut 204 may then be allowed to move linearly along axis 208 relative to lead screw 202.

Figure 5:
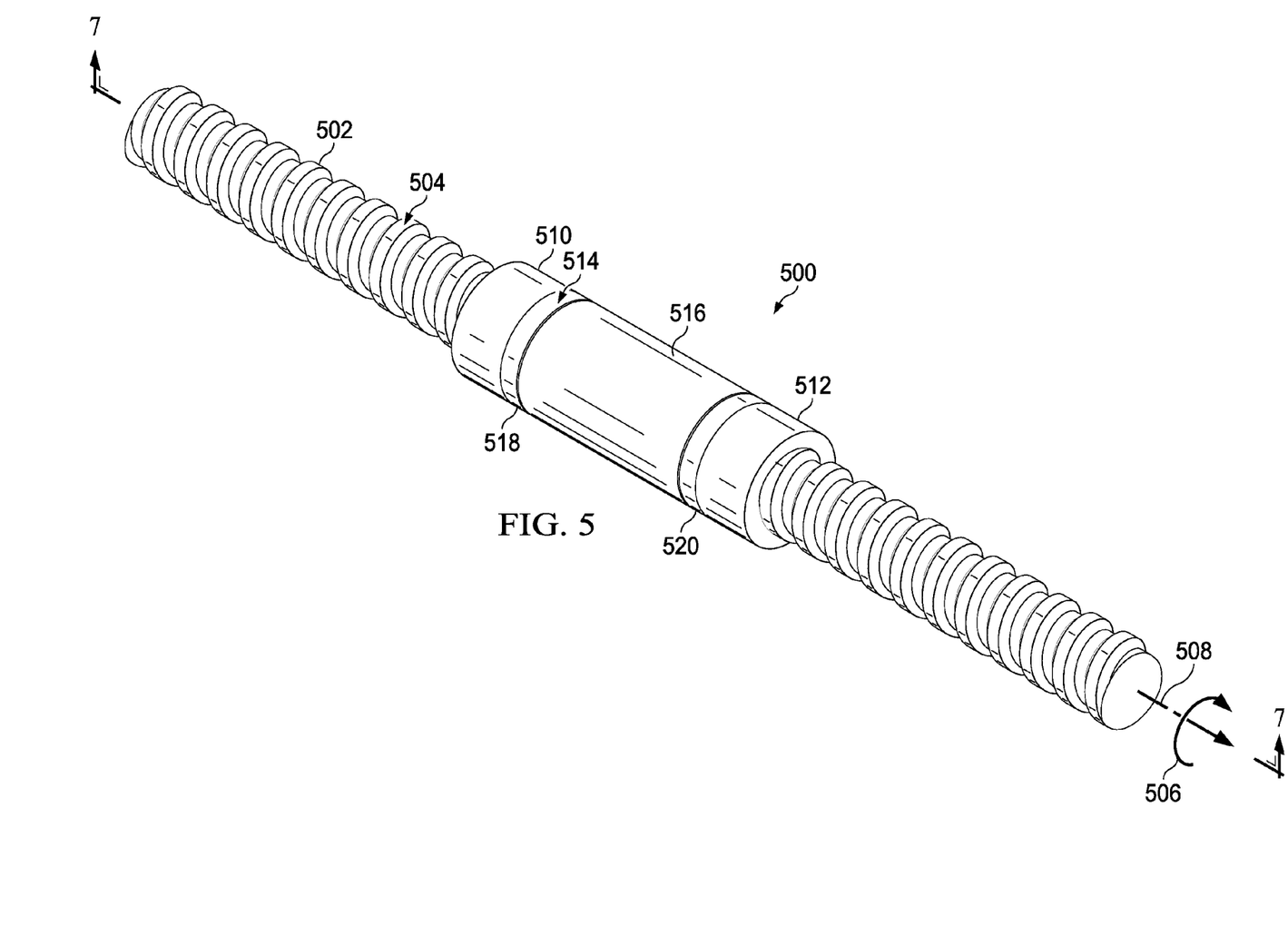
FIG. 5 is an illustration of an isometric view of a different configuration for a locking mechanism in accordance with an illustrative embodiment.

With reference now to FIG. 5, an illustration of an isometric view of a different configuration for a locking mechanism is depicted in accordance with an illustrative embodiment. In this illustrative example, locking mechanism 500 may be an example of one implementation for locking mechanism 100 in FIG. 1.

Locking mechanism 500 may be used with lead screw 502. Lead screw 502 is an example of one implementation for lead screw 114 in FIG. 1. As depicted, lead screw 502 has external thread 504.

Lead screw 502 may be rotated in the direction of arrow 506 about axis 508 to cause first nut 510 and second nut 512 to move in a direction along axis 508. First nut 510 and second nut 512 may be examples of implementations for first internally threaded member 138 and second internally threaded member 140, respectively, in FIG. 1.

In this illustrative example, locking mechanism 500 comprises shape memory element 514 and heating device 516. Shape memory element 514 is an example of one implementation for shape memory element 128 in FIG. 1. In this illustrative example, shape memory element 514 may function as a shape memory actuator. Shape memory element 514 may be attached to first nut 510 and second nut 512 in this illustrative example.

Heating device 516 is an example of one implementation for shape control device 130 in FIG. 1. Heating device 516 is attached to shape memory element 514 and positioned between flange 518 and flange 520 of shape memory element 514 in this example. Heating device 516 may heat shape memory element 514 to change a shape of shape memory element 514 such that movement of first nut 510 and second nut 512 along axis 508 is prevented.

Figure 6:
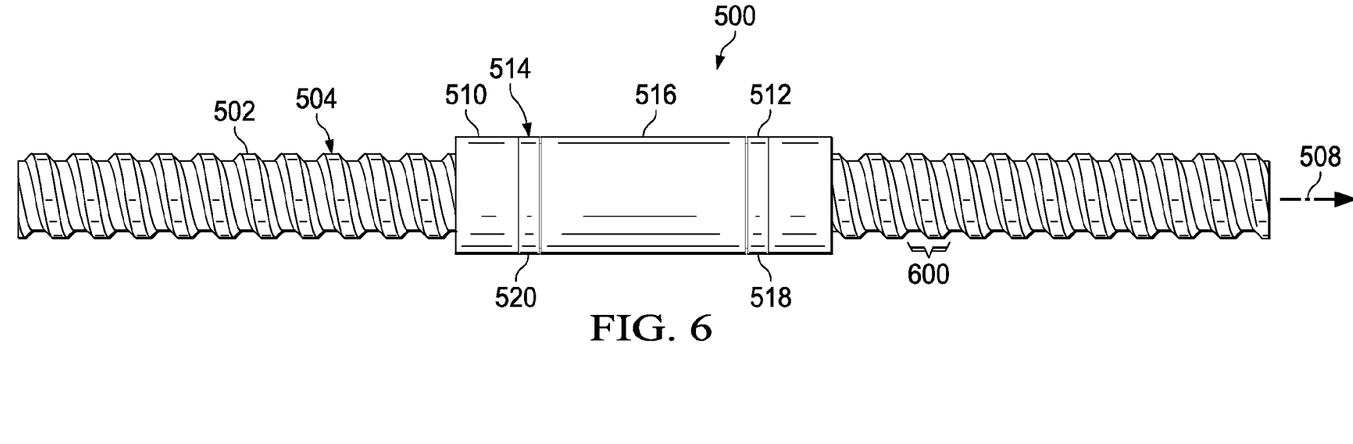
FIG. 6 is an illustration of a side view of a locking mechanism and a lead screw in accordance with an illustrative embodiment.

With reference now to FIG. 6, an illustration of a side view of locking mechanism 500 and lead screw 502 from FIG. 5 is depicted in accordance with an illustrative embodiment. As depicted, external thread 504 of lead screw 502 has thread pitch 600.

Figure 7:
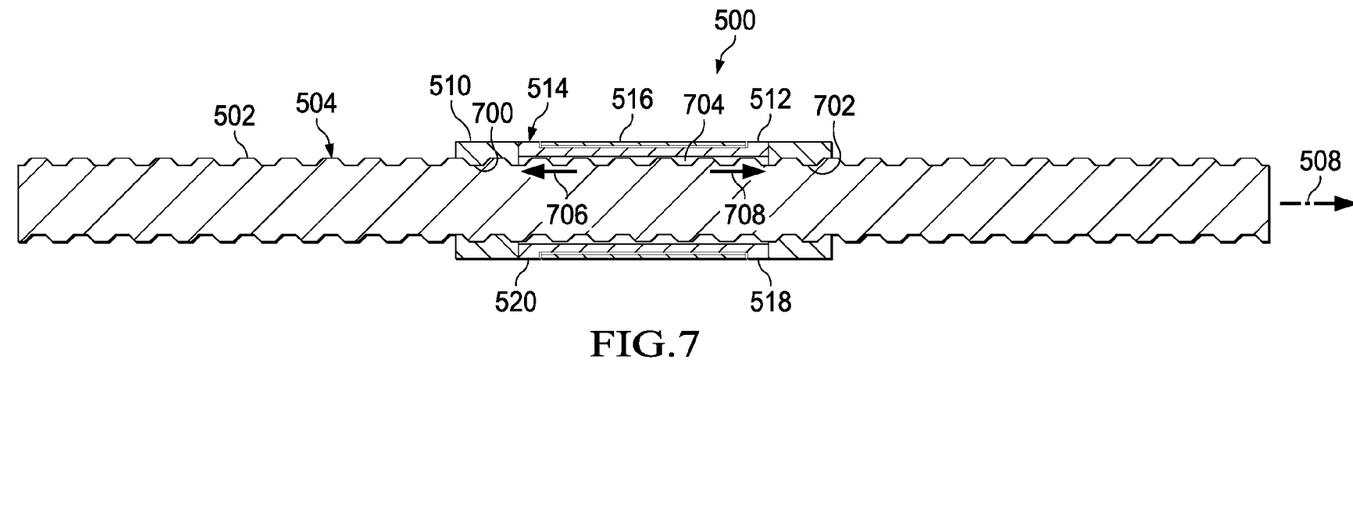
FIG. 7 is an illustration of a cross-sectional view of a locking mechanism and a lead screw in accordance with an illustrative embodiment.

Turning now to FIG. 7, an illustration of a cross-sectional view of locking mechanism 500 and lead screw 502 from FIGS. 5-6 is depicted in accordance with an illustrative embodiment. In particular, in FIG. 7, a cross-sectional view of locking mechanism 500 and lead screw 502 from FIGS. 5-6 is depicted taken with respect to lines 7-7 in FIG. 5.

In this illustrative example, first internal thread 700 of first nut 510 and second internal thread 702 of second nut 512 are shown. First internal thread 700 and second internal thread 702 are configured to engage external thread 504 of lead screw 502.

As depicted, shape memory element 514 has bearing surface 704 that does not conform to external thread 504. In other words, bearing surface 704 may contact external thread 504 but may not engage external thread 504.

Heating device 516 may be configured to heat shape memory element 514 such that shape memory element 514 expands. The expansion of shape memory element 514 applies first force 706 to first nut 510 and second force 708 to second nut 512. These forces push first nut 510 and second nut 512 away from each other. Further, these forces prevent first nut 510 and second nut 512 from being able to rotate relative to lead screw 502. In this manner, first nut 510 and second nut 512 may be prevented from moving linearly along axis 508 relative to lead screw 502.

When the temperature of shape memory element 514 returns to a baseline temperature or within a selected range of the baseline temperature, the shape of shape memory element 514 may return to its baseline shape and first force 706 and second force 708 may be removed. In this manner, first nut 510 and second nut 512 may then be allowed to move linearly along axis 508 relative to lead screw 502.

The illustrations of locking mechanism 200 in FIGS. 2-4 and locking mechanism 500 in FIGS. 5-7 are not meant to imply physical or architectural limitations to the manner in which an illustrative embodiment may be implemented. Other components in addition to or in place of the ones illustrated may be used. Some components may be optional.

The different components shown in FIGS. 2-7 may be illustrative examples of how components shown in block form in FIG. 1 can be implemented as physical structures. Additionally, some of the components in FIGS. 2-7 may be combined with components in FIG. 1, used with components in FIG. 1, or a combination of the two.

Figure 8:
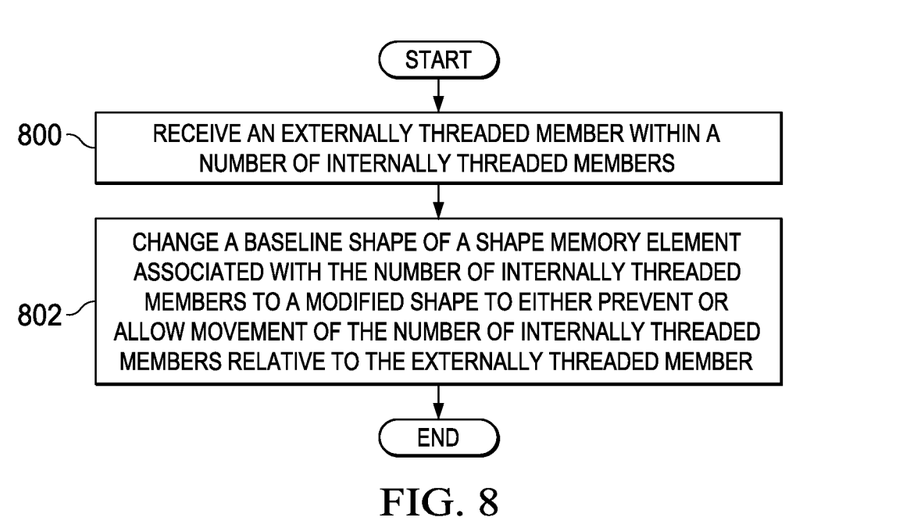
FIG. 8 is an illustration of a process for locking an externally threaded member and a number of internally threaded members in the form of a flowchart in accordance with an illustrative embodiment.

With reference now to FIG. 8, an illustration of a process for locking an externally threaded member and a number of internally threaded members is depicted in the form of a flowchart in accordance with an illustrative embodiment. The process illustrated in FIG. 8 may be implemented using a locking mechanism such as, for example, locking mechanism 100 in FIG. 1, to lock an externally threaded member with a number of internally threaded members. In particular, this process may be used to prevent movement of the number of internally threaded members relative to the externally threaded member.

The process may begin by receiving an externally threaded member within a number of internally threaded members (operation 800). In operation 800, rotational motion of the externally threaded member relative to the number of internally threaded members is translated into linear motion of the number of internally threaded members relative to the externally threaded member.

Thereafter, a baseline shape of a shape memory element associated with the number of internally threaded members is changed to a modified shape using a shape control device to either prevent or allow the movement of the number of internally threaded members relative to the externally threaded member (operation 802), with the process terminating thereafter Operation 802 may be performed by changing, for example, the temperature of the shape memory element. For example, the shape memory element may be either cooled or heated to change the shape of the shape memory element from a baseline shape to a modified shape. In one illustrative example, when the shape memory element has the baseline shape, the number of internally threaded members may be allowed to move relative to the externally threaded member by rotating relative to the externally threaded member and moving linearly along an axis through the number of internally threaded members. In this example, when the shape memory element has the modified shape, the number of internally threaded members may be prevented from moving relative to the externally threaded element.

Figure 9:
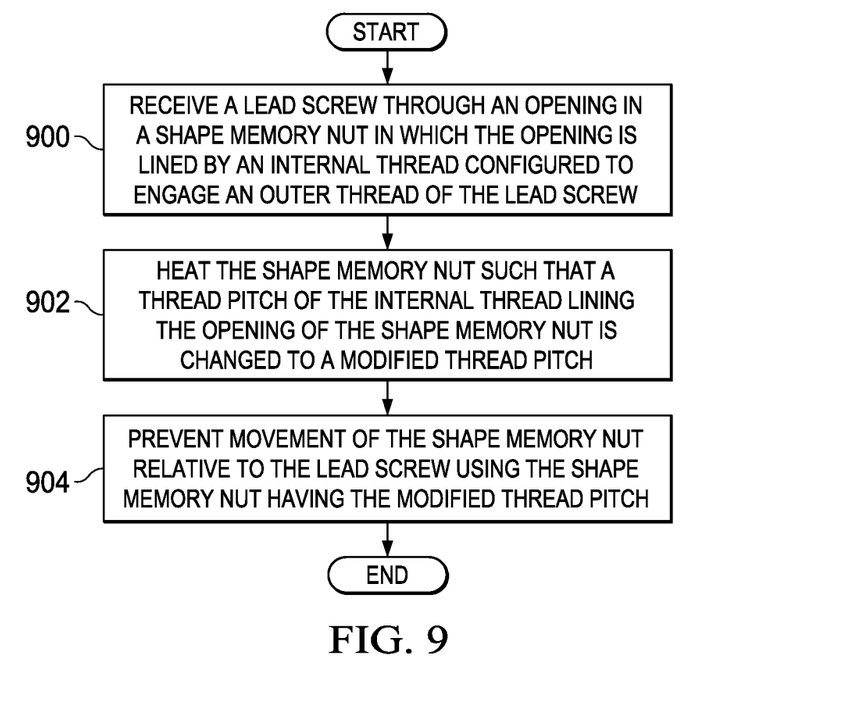
FIG. 9 is an illustration of a process for locking in place a shape memory nut engaged with a lead screw in the form of a flowchart in accordance with an illustrative embodiment.

With reference now to FIG. 9, an illustration of a process for locking in place a shape memory nut engaged with a lead screw is depicted in the form of a flowchart in accordance with an illustrative embodiment. The process illustrated in FIG. 9 may be implemented using a locking mechanism such as, for example, locking mechanism 100 in FIG. 1. In particular, the process may be implemented using a locking mechanism implemented in a manner similar to locking mechanism 200 in FIG. 2.

The process begins by receiving a lead screw through an opening in a shape memory nut in which the opening is lined by an internal thread configured to engage an outer thread of the lead screw (operation 900). Next, the shape memory nut is heated such that a thread pitch of the internal thread lining the opening of the shape memory nut is changed to a modified thread pitch (operation 902). In operation 902, changing the thread pitch of the internal thread of the shape memory nut changes the manner in which the nut engages the lead screw. Consequently, movement of the shape memory nut relative to the lead screw is prevented using the shape memory nut having the modified thread pitch (operation 904), with the process terminating thereafter.

Figure 10:
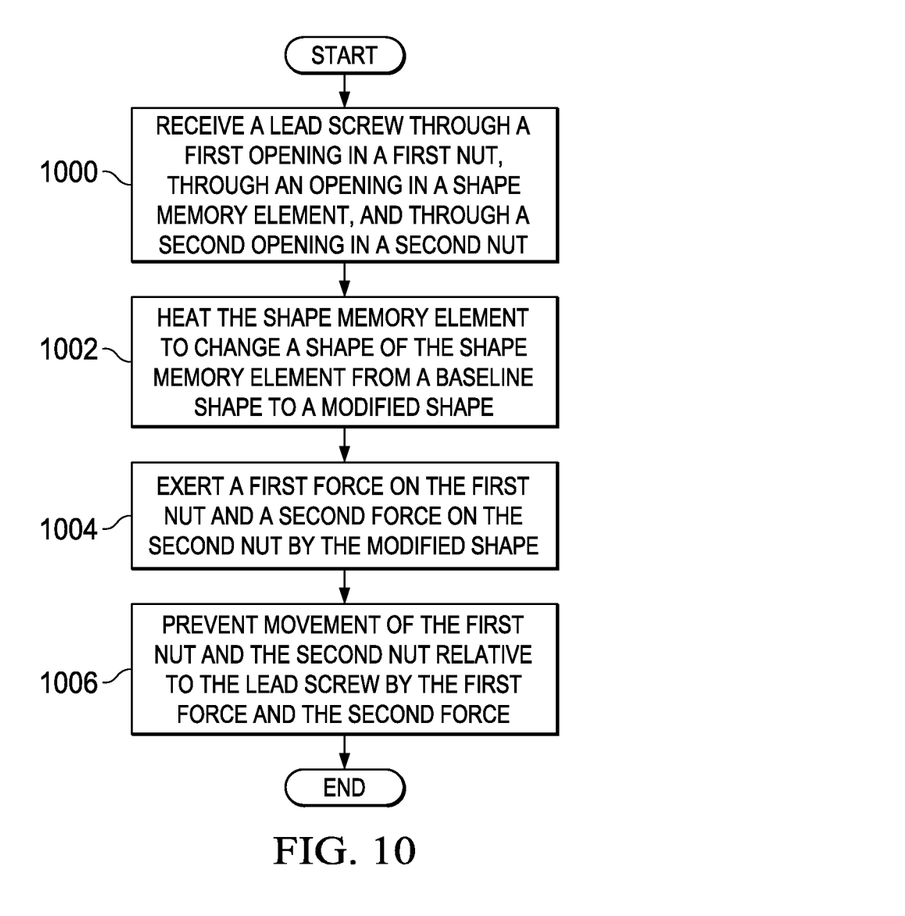
FIG. 10 is an illustration of a process for locking in place two nuts engaged with a lead screw in the form of a flowchart in accordance with an illustrative embodiment.

With reference now to FIG. 10, an illustration of a process for locking in place two nuts engaged with a lead screw is depicted in the form of a flowchart in accordance with an illustrative embodiment. The process illustrated in FIG. 10 may be implemented using a locking mechanism such as, for example, locking mechanism 100 in FIG. 1. In particular, the process may be implemented using a locking mechanism similar to locking mechanism 500 in FIG. 5.

The process begins by receiving a lead screw through a first opening in a first nut, through an opening in a shape memory element, and through a second opening in a second nut (operation 1000). The first nut and the second nut may have internal threads configured to engage the lead screw. The shape memory element may have a substantially smooth bearing surface with no thread.

Next, the shape memory element may be heated to change a shape of the shape memory element from a baseline shape to a modified shape (operation 1002). In response to the shape memory element having the modified shape, a first force is exerted on the first nut and a second force is exerted on the second nut by the modified shape (operation 1004). Movement of the first nut and the second nut relative to the lead screw is prevented by the first force and the second force (operation 1006), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a number of internally threaded members formed at least in part from a shape memory element and configured to engage an externally threaded member; and
   a shape control device integral with the number of internally threaded members and configured to change the shape memory element from a baseline shape to a modified shape, wherein changing the baseline shape of the shape memory element to the modified shape either prevents or allows movement of the number of internally threaded members relative to the externally threaded member.

2. The apparatus of claim 1, wherein the shape memory element is an internal thread of the internally threaded member that is configured to engage an external thread of the externally threaded member.

3. The apparatus of claim 2, wherein changing from the baseline shape of the shape memory element to the modified shape changes a thread pitch of the internal thread of the internally threaded member such that rotational motion of the number of internally threaded members relative to the externally threaded member is prevented.

4. The apparatus of claim 1, wherein the number of internally threaded members comprises:
   a first internally threaded member configured to receive the externally threaded member; and
   a second internally threaded member configured to receive the externally threaded member, wherein the shape memory element is associated with and positioned between the first internally threaded member and the second internally threaded member.

5. The apparatus of claim 4, wherein changing the baseline shape of the shape memory element to the modified shape exerts a first force on the first internally threaded member and exerts a second force on the second internally threaded member that prevent rotational motion of the number of internally threaded members relative to the externally threaded member.

6. The apparatus of claim 4, wherein the first internally threaded member is a first nut and wherein the second internally threaded member is a second nut.

7. The apparatus of claim 1, wherein the shape control device is a heating device configured to heat the shape memory element such that the shape memory element changes from the baseline shape to the modified shape.

8. The apparatus of claim 7, wherein the shape of the shape memory element is configured to return to the baseline shape within selected tolerances when a temperature of the shape memory element returns to a baseline temperature within selected tolerances.

9. The apparatus of claim 7, wherein the heating device is concentrically disposed around the number of internally threaded members, the apparatus further comprising:
   a number of flanges extending outward from the number of internally threaded members and retaining the heating device in concentric alignment with the number of internally threaded members.

10. The apparatus of claim 9, wherein the heating device is a passive heating device.

11. The apparatus of claim 1, wherein the shape memory element and the shape control device form a locking mechanism.

12. The apparatus of claim 1, wherein the shape memory element is comprised of a shape memory material.

13. The apparatus of claim 12, wherein the shape memory material is a nickel titanium alloy.

14. The apparatus of claim 1, wherein the externally threaded member is a lead screw.

15. A locking mechanism comprising:
   a shape memory element associated with a number of internally threaded members engaged with an externally threaded member; and
   a shape control device integral with the number of internally threaded members and configured to change the shape memory element from a baseline shape to a modified shape, wherein changing the baseline shape of the shape memory element to the modified either prevents or allows movement of the number of internally threaded members relative to the externally threaded member.

16. A method for operating an externally threaded member with a number of internally threaded members, the method comprising:
   receiving the externally threaded member within the number of internally threaded members; and
   changing a shape of a shape memory element associated with the number of internally threaded members from a baseline shape to a modified shape using a shape control device integral with the number of internally threaded members, wherein changing the shape either prevents or allows movement of the number of internally threaded members relative to the externally threaded member.

17. The method of claim 16, wherein receiving the externally threaded member within the number of internally threaded members comprises:
   receiving the externally threaded member through an opening in an internally threaded member in the number of internally threaded members, wherein the shape memory element is an internal thread of the internally threaded member that is configured to engage an external thread of the externally threaded member.

18. The method of claim 17, wherein changing the baseline shape of the shape memory element to the modified shape comprises:
   changing a temperature of the shape memory element to change a thread pitch of the internal thread such that rotational motion of the internally threaded member relative to the externally threaded member is prevented.

19. The method of claim 16, wherein receiving the externally threaded member within the number of internally threaded members comprises:
   receiving the externally threaded member through a first opening in a first internally threaded member in the number of internally threaded members, through an opening in the shape memory element, and through a second opening in a second internally threaded member in the number of internally threaded members, wherein the shape memory element is associated with and positioned between the first internally threaded member and the second internally threaded member.

20. The method of claim 19, wherein changing the baseline shape of the shape memory element to the modified shape comprises:
   changing a temperature of the shape memory element to change the baseline shape of the shape memory element to the modified shape such that a first force is exerted on the first internally threaded member and a second force is exerted on the second internally threaded member to prevent rotational motion of the first internally threaded member and the second internally threaded member relative to the externally threaded member.

* * * * *